(No Model.)
W. F. IRVINE.
WEIGHING APPARATUS.
No. 331,640. Patented Dec. 1, 1885.
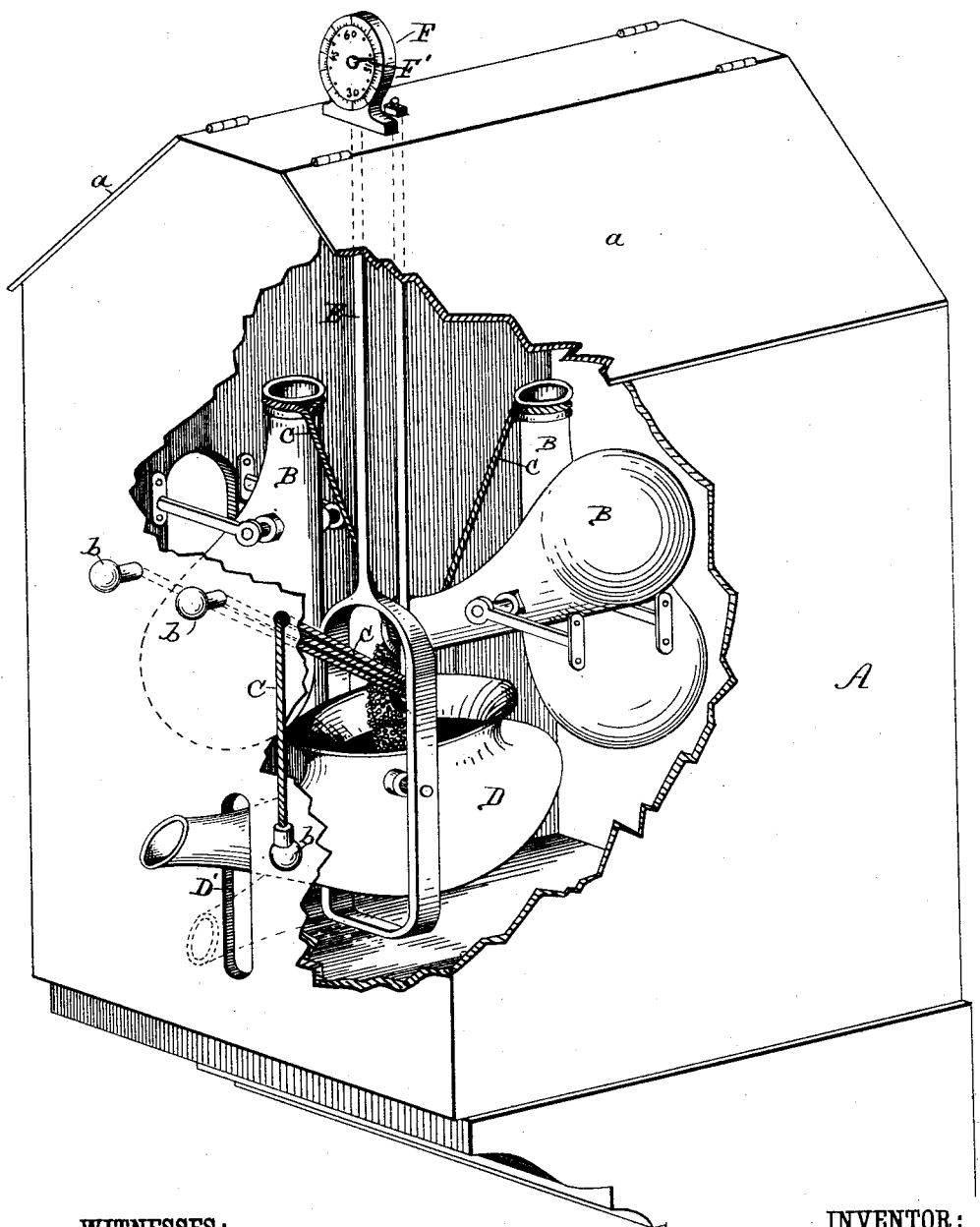
WITNESSES:
Thos. Houghton.
Amos W. Hart
INVENTOR:
Wm. F. Irvine
BY Munn & Co.
ATTORNEYS.

UNITED STATES PATENT OFFICE.

WILLIAM FIELDING IRVINE, OF LAMPASAS, TEXAS.

WEIGHING APPARATUS.

SPECIFICATION forming part of Letters Patent No. 331,640, dated December 1, 1885.

Application filed February 13, 1885. Serial No. 155,862. (No model.)

*To all whom it may concern:*

Be it known that I, WILLIAM FIELDING IRVINE, a citizen of the United States, residing at Lampasas, in the county of Lampasas and State of Texas, have invented certain new and useful Improvements in Weighing Apparatus, of which the following is a description.

The object of my invention is to provide an improved apparatus for use in weighing shot, powder, spices, and various other articles which are sold in small quantities. Within a case or box I pivot in vertical position a number of large wide-mouthed bottles, which are to be filled with shot, powder, &c., and I connect with them a corresponding series of cords, by pulling which the said bottles may be easily tilted to cause discharge of their contents into a pan or scoop. The latter is pivoted and balanced on a pendent rod, constituting part of a weighing device, and projects through an opening in the box, so that whatever quantity of shot, &c., it receives from the bottles arranged in suitable proximity to it may be delivered outside said box into a bag or other receptacle provided for the purpose. The rod that supports the pan is pendent from a spring or other form of scale adapted to indicate the weight of the article deposited in the pan, and such indicator is located on the top of the box, so as to be conveniently seen by the salesman and customer.

The accompanying drawing represents a perspective view, part being broken away, of a box containing apparatus constructed and arranged according to my invention.

All the working parts of the apparatus save the indicator are inclosed in the box A, which is provided with lids $a$ $a$, and made of such form and size as adapt it to be located on a counter or supported on brackets where it will be conveniently accessible. The shot, powder, or other article to be sold is contained in bottles B, (preferably of glass,) that are pivoted and supported above their middle, so that they hang normally vertical with mouth upward. Suitable eyes or sockets are formed in the sides of such bottles to receive the points of screws or other pivoting devices. A cord, C, is connected with the upper end of each bottle, that extends to a knob, $b$, which is conveniently accessible in the end of the box A. Intermediately of the bottles and knobs the cords pass through eyelets, loops, or other guides of suitable construction. The aforesaid bottles B are located around the inner sides of the box in such relation to the pan or scoop D that when tilted their mouths will project over the latter, so as to discharge their contents into it. The pan D is pivoted and balanced on a platform or in arms rigidly connected with a rod, E, pendent from the weighing device proper, F, which is located on the top of the box A. One end of the pan D is funnel-shaped and projects through a vertical slot, D', in the box A, which construction and arrangement permit the pan to be tilted for the purpose of discharging its contents into a bag or other exterior receptacle.

The indicator of the weighing device F consists of a dial suitably graduated and inscribed with numbers representing pounds and ounces, and provided with a rotary index or pointer, E'. Within the indicator the rod E connects in a well-known manner with a lever mechanism, whose action is resisted by a spring, the degree of resistance being the measure of the weight of the article placed in the pan.

The apparatus is used as follows: Let it be supposed a customer desires ten pounds of shot, and that one or more of the pivoted bottles B contains such article. The salesman pulls the knob $b$, whose cord C connects with such bottle, and thereby tilts it, so that shot discharge therefrom into the pan D, which immediately begins to descend under the effect of the added weight. Meanwhile the salesman watches the dial, and when the index has rotated to the number 10 he instantly releases the knob $b$, and thus as quickly arrests the flow of shot into the pan, since the bottle as quickly tilts back to its normal vertical position. Then by depressing the projecting end or nose of the pan D it is tilted and its contents delivered outside the box into a bag held in the required proximity.

The case A protects the bottles and pan from disturbance and injury and access of dirt, dust, or other substances foreign to the articles to be sold. The latter may be conveniently placed in the bottles, as required, by opening the lids $a$ of the box.

What I claim as new is—

1. The combination, with the weighing-pan D, of the series of independent shot-holders B, pivoted and suspended normally vertical and arranged around said pan, as shown and described, whereby any one of them may be tilted and its contents discharged into the pan, as specified.

2. The combination, with the box A, having a slot, of the weighing device proper, and an indicating attachment located on the top of the box, the rod E, pendent from said device, and a pan, D, pivoted to the lower end of the rod and projecting through the slot, all as shown and described, to operate as specified.

3. An improved apparatus for containing and weighing shot and powder, the same consisting of the box A, slotted as specified, the pivoted bottles B and connecting-cords and knobs, the pan D, pivoted and projecting through the slot, the weighing device proper, and indicator located on top of the box, and having a rod pendent from it and supporting the said pan, as shown and described.

WILLIAM FIELDING IRVINE.

Witnesses:
HENRY EXALL,
J. W. GREEN,
C. R. KING.